Patented Jan. 3, 1939

2,142,279

UNITED STATES PATENT OFFICE 2,142,279

ADHESIVE

Adolf Menger, Krefeld-Bockum, Germany, assignor to I. G. Farbenindustrie Aktiengesellschaft, Frankfort-on-the-Main, Germany No Drawing. Application January 31, 1934, Serial No. 709,186. In Germany February 8, 1933

19 Claims. (Cl. 154—46)

The present invention relates to the manufacture of adhesives by employing a halogenated polyvinyl halide with or without the employment of a customary adhesive or additions to adhesives.

In accordance with the invention adhesives with a base of halogenated polyvinyl chlorides and especially partially depolymerized halogenated polyvinyl chlorides, such as are obtainable for example in accordance with the co-pending application Serial No. 670,213, filed May 9, 1933, now Patent No. 1,982,765, by further chlorination of polyvinyl chloride in the presence of solvents or agents promoting the formation of suspensions, are employed for cementing materials of all kinds, such as for example, paper, pasteboard, textiles, wood, artificial materials, such as galalith and a phenolaldehyde condensation product, a brand of which is marketed under the trademark "Bakelite", leather, porcelain, earthenware, metal, glass and the like. Certain polymerized vinyl chlorides are described in said patent, and particularly in claim 6 thereof, as having a chlorine content higher than 57 per cent and up to about 70 per cent, being soluble to the extent of about 20 per cent to 30 per cent in butyl acetate, a mixture of acetone and benzene, and in ethylene chloride, and forming films having a tensile strength of 5 to 7 kilos per sq. mm. The cementing obtainable by means of such an adhesive is distinguished by good stability against water and the influence of the weather and the adhesive film possesses in addition a very good pliability and flexibility, which, moreover, can still be considerably enhanced by the addition of softening agents, such as esters of compounds of p-toluene sulfonic acid and o-phosphoric acid, phthalic acid and adipic acid, ethyl acetanilide and the like. On account of the said properties the adhesives are especially suitable for the manufacture of leather cements employed for example in the shoe industry and surpass quite considerably, particularly in adhesive power, the cellulose cement customarily used in this industry.

The noteworthy stability of the adhesives against light, in particular the small tendency to turn yellow under the influence of light, renders them particularly suitable for the manufacture of safety glass.

For the manufacture of adhesives the partially depolymerized chlorinated polyvinyl chloride can be employed as such or in admixture with other adhesives or with the additions customarily used for adhesives; thus there can be added solvents, such as acetone, the methyl, ethyl and butyl esters of acetic acid, or mixtures of the said solvents with benzine, benzene, toluene and the like and softening agents, as already indicated. Moreover, it will be possible to incorporate with the adhesives natural and artificial resins, such as pine resin and copal, cumaron resin and resin-like condensation products obtainable from polybasic and monobasic carboxylic acids with polyvalent alcohols, as well as pigments, fillers and fibrous materials, such as iron oxide, zinc oxide, chromic oxide, wood meal, asbestos powder, powdered shale, flock, asbestos fibres and the like.

The invention is illustrated by the following examples, but not restricted thereby:

Example 1

An adhesive for cementing paper is produced by dissolving 20 parts by weight of partially depolymerized chlorinated polyvinyl chloride (obtainable in accordance with Example 1 of Patent No. 1,982,765 and having a chlorine content from 64 to 66 per cent, being soluble to the extent of about 25 per cent in butyl acetate, a mixture of acetone and benzene, and in ethylene chloride and forming films having a tensile strength of 5 to 6 kilos per sq. mm.) in 80 parts by weight of methylene chloride. It is distinguished by excellent adhesive power and noteworthy pliability and flexibility.

Example 2

An adhesive for cementing leather is produced by dissolving 22 parts by weight of the above mentioned partially depolymerized chlorinated polyvinyl chloride and 4 parts by weight of ethylacetanilide in 47 parts by weight of ethyl acetate. It possesses very good pliability and flexibility, excellent tenacity and good stability against chemical influences.

Example 3

An adhesive for cementing a textile material, such as for example sail cloth, is produced by dissolving 20 parts by weight of partially depolymerized chlorinated polyvinyl chloride (obtainable in accordance with Example 2 of Patent No. 1,982,765) and 5 parts by weight of dimethyl phthalate in 60 parts by weight of acetone and 15 parts by weight of benzene.

The cemented material exhibits essentially the same properties as the leather cement described in Example 2.

I claim:

1. An article of manufacture comprising two or more solid objects cemented together with an adhesive layer consisting essentially of a halogenated polyvinyl halide obtainable by treating a polymerized vinyl halide with halogen in the presence of an organic solvent or swelling agent.

2. An article of manufacture comprising two or more solid objects cemented together with an adhesive layer consisting essentially of a chlorinated polyvinyl chloride obtainable by treating a polymerized vinyl chloride with chlorine in the presence of an organic solvent or swelling agent.

3. An article of manufacture comprising two or more solid objects cemented together with an adhesive layer consisting essentially of a partially depolymerized halogenated polyvinyl chloride obtainable by treating a polymerized vinyl chloride with halogen in the presence of an organic solvent or swelling agent and partially depolymerizing the halogenated polyvinyl chloride.

4. An article of manufacture comprising two or more solid objects cemented together with an adhesive layer consisting essentially of a partially depolymerized chlorinated polyvinyl chloride obtainable by treating a polymerized vinyl chloride with chlorine in the presence of an organic solvent or swelling agent and partially depolymerizing the chlorinated polyvinyl chloride.

5. An article of manufacture comprising two or more solid objects cemented together with an adhesive layer consisting essentially of a partially depolymerized chlorinated polyvinyl chloride, obtainable by treating a polymerized vinyl chloride with chlorine in the presence of an organic solvent or swelling agent and partially depolymerizing the chlorinated polyvinyl chloride, and a solvent for the partially depolymerized chlorinated polyvinyl chloride.

6. An article of manufacture comprising two or more solid objects cemented together with an adhesive layer consisting essentially of a partially depolymerized chlorinated polyvinyl chloride, obtainable by treating a polymerized vinyl chloride with chlorine in the presence of an organic solvent or swelling agent and partially depolymerizing the chlorinated polyvinyl chloride, a solvent for the partially depolymerized chlorinated polyvinyl chloride and a softening agent.

7. An article of manufacture comprising two or more solid objects cemented together with an adhesive layer consisting essentially of a solution in methylene chloride of a partially depolymerized chlorinated polyvinyl chloride obtainable by treating a polymerized vinyl chloride with chlorine in the presence of an organic solvent or swelling agent and partially depolymerizing the chlorinated polyvinyl chloride.

8. An article of manufacture comprising two or more solid objects cemented together with an adhesive layer consisting essentially of a solution in ethyl acetate of ethyl acetanilide and a partially depolymerized chlorinated polyvinyl chloride obtainable by treating a polymerized vinyl chloride with chlorine in the presence of an organic solvent or swelling agent and partially depolymerizing the chlorinated polyvinyl chloride.

9. An article of manufacture comprising two or more solid objects cemented together with an adhesive layer consisting essentially of a solution in a mixture of acetone and benzene of dimethyl phthalate and a partially depolymerized chlorinated polyvinyl chloride obtainable by treating a polymerized vinyl chloride with chlorine in the presence of an organic solvent or swelling agent and partially depolymerizing the chlorinated polyvinyl chloride.

10. An article of manufacture comprising two or more leather sheets cemented together with an adhesive layer consisting essentially of a chlorinated polyvinyl chloride obtainable by treating a polymerized vinyl chloride with chlorine in the presence of an organic solvent or swelling agent.

11. An article of manufacture comprising two or more leather sheets cemented together with an adhesive layer consisting essentially of a partially depolymerized chlorinated polyvinyl chloride obtainable by treating a polymerized vinyl chloride with chlorine in the presence of an organic solvent or swelling agent and partially depolymerizing the chlorinated polyvinyl chloride.

12. An article of manufacture comprising two or more leather sheets cemented together with an adhesive layer consisting essentially of a partially depolymerized chlorinated polyvinyl chloride, obtainable by treating a polymerized vinyl chloride with chlorine in the presence of an organic solvent or swelling agent and partially depolymerizing the chlorinated polyvinyl chloride, a solvent for the partially depolymerized chlorinated polyvinyl chloride and a softening agent.

13. An article of manufacture comprising two or more leather sheets cemented together with an adhesive layer consisting essentially of a solution in methylene chloride of a partially depolymerized chlorinated polyvinyl chloride obtainable by treating a polymerized vinyl chloride with chlorine in the presence of an organic solvent or swelling agent and partially depolymerizing the chlorinated polyvinyl chloride.

14. An article of manufacture comprising two or more leather sheets cemented together with an adhesive layer consisting essentially of a solution in ethyl acetate of ethyl acetanilide and a partially depolymerized chlorinated polyvinyl chloride obtainable by treating a polymerized vinyl chloride with chlorine in the presence of an organic solvent or swelling agent and partially depolymerizing the chlorinated polyvinyl chloride.

15. An article of manufacture comprising two or more leather sheets cemented together with an adhesive layer consisting essentially of a solution in a mixture of acetone and benzene of dimethyl phthalate and a partially depolymerized chlorinated polyvinyl chloride obtainable by treating a polymerized vinyl chloride with chlorine in the presence of an organic solvent or swelling agent and partially depolymerizing the chlorinated polyvinyl chloride.

16. An article of manufacture comprising two or more materials such as paper, pasteboard, textiles, wood, galalith, phenol-aldehyde condensation products, leather, porcelain, earthenware, metal, glass and the like, cemented together with an adhesive layer consisting essentially of a halogenated polyvinyl halide obtained by treating a polymerized vinyl halide with halogen in the presence of an organic solvent or swelling agent.

17. An article of manufacture comprising two or more materials such as paper, pasteboard, textiles, wood, galalith, phenol-aldehyde condensation products, leather, porcelain, earthenware, metal, glass and the like, cemented together with an adhesive layer consisting essentially of a halogenated polyvinyl halide substantially identical with the material obtained by treating a polymerized vinyl halide with halogen in the presence of an organic solvent or swelling agent.

18. An article of manufacture comprising two or more materials such as paper, pasteboard, textiles, wood, galalith, phenol-aldehyde condensation products, leather, porcelain, earthenware, metal, glass and the like, cemented together with an adhesive layer consisting essentially of a polymerized vinyl chloride, said polymerized vinyl chloride having a chlorine content higher than 57 per cent and up to about 70 per cent, being soluble to the extent of about 20 per cent to 30 per cent in butyl acetate, a mixture of acetone and benzene, and in ethylene chloride, and forming films having a tensile strength of 5 to 7 kilos per sq. mm.

19. An article of manufacture comprising two or more materials such as paper, pasteboard, textiles, wood, galalith, phenol-aldehyde condensation products, leather, porcelain, earthenware, metal, glass and the like, cemented together with an adhesive layer consisting essentially of a polymerized vinyl chloride, said polymerized vinyl chloride having a chlorine content from 64 to 66 per cent, being soluble to the extent of about 25 per cent in butyl acetate, a mixture of acetone and benzene, and in ethylene chloride and forming films having a tensile strength of 5 to 6 kilos per sq. mm.

ADOLF MENGER.